(12) United States Patent
Sorlie et al.

(10) Patent No.: US 12,085,191 B2
(45) Date of Patent: Sep. 10, 2024

(54) SYSTEM FOR TESTING A VALVE (71) Applicant: Inline Test AS, Molde (NO)

(72) Inventors: Jan Gregor Hoydahl Sorlie, Molde (NO); Albert Andre Buer, Porsgrunn (NO)

(73) Assignee: Inline Test AS, Porsgrunn (NO)

( * ) Notice: Subject to any disclaimer, the term of this patent is extended or adjusted under 35 U.S.C. 154(b) by 561 days.

(21) Appl. No.: 17/271,070

(22) PCT Filed: Aug. 23, 2019

(86) PCT No.: PCT/EP2019/072582
§ 371 (c)(1),
(2) Date: Feb. 24, 2021

(87) PCT Pub. No.: WO2020/039067
PCT Pub. Date: Feb. 27, 2020

(65) Prior Publication Data
US 2021/0199214 A1 Jul. 1, 2021

(30) Foreign Application Priority Data

Aug. 24, 2018 (NO) .................................... 20181116

(51) Int. Cl.
*F16K 37/00* (2006.01)
*G01M 3/28* (2006.01)
*G01M 13/003* (2019.01)

(52) U.S. Cl.
CPC ...... *F16K 37/0091* (2013.01); *F16K 37/0075* (2013.01); *F16K 37/0083* (2013.01); *G01M 3/2876* (2013.01); *G01M 13/003* (2019.01)

(58) Field of Classification Search
CPC ............. F16K 37/0083; F16K 37/0075; F16K 37/0091; G01M 3/2876; G01M 13/003
See application file for complete search history.

(56) References Cited

U.S. PATENT DOCUMENTS 4,840,057 A * 6/1989 Bingham ............ F16K 37/0091
  73/1.72
4,903,529 A * 2/1990 Hodge ................ G01M 3/2876
  73/37

(Continued)

FOREIGN PATENT DOCUMENTS

CN 104633457 A 5/2015
CN 107664573 A 2/2018

(Continued)

OTHER PUBLICATIONS

First Office Action and Search Report (English Translation) in International Application No. 201980070266.4 dated Sep. 22, 2022, 12 pages.

(Continued)

*Primary Examiner* — Helen C Kwok
(74) *Attorney, Agent, or Firm* — Smith Baluch LLP (57) ABSTRACT

A portable system (100) for testing a valve (3) in a process plant. At least one upstream (102) or downstream (104) connector permits fluid contact to a respective upstream isolation valve (2) or a downstream isolation valve (4). A summation technique enables detection and quantification of a small leakage (20, 40) through either isolation valve (2, 4) during testing or certification of the valve (3). A portable computer (110) runs a controller (120) for automatic testing or certification. The controller (120) supports branching into separate diagnostic routines depending on measurements from sensors (122, 124). A security system (130) ensures reliable and confidential measurement data, and facilitates certification. Areas of use include chemical factories, offshore platforms for producing hydrocarbons and treatment plants aboard ships.

20 Claims, 3 Drawing Sheets

(56) References Cited

U.S. PATENT DOCUMENTS

| | | |
|---|---|---|
| 6,167,749 B1 | 1/2001 | Yanagisawa et al. |
| 6,505,501 B1 | 1/2003 | Murphy et al. |
| 9,335,078 B1 | 5/2016 | Buggs |
| 2004/0261856 A1* | 12/2004 | Klaver .................... F16K 37/00 137/487.5 |
| 2005/0199286 A1* | 9/2005 | Appleford ................ F17D 3/00 137/487.5 |
| 2011/0144946 A1* | 6/2011 | Flanders ................ E21B 34/02 702/183 |
| 2015/0136234 A1 | 5/2015 | Zulfiquar |
| 2015/0204701 A1* | 7/2015 | Klicpera .................. G01M 3/00 137/624.11 |
| 2021/0199214 A1 | 7/2021 | Sorlie et al. |
| 2022/0107032 A1* | 4/2022 | Genta .................... F16K 41/046 |
| 2022/0112961 A1* | 4/2022 | Dyrdal ................ F16K 37/0083 |

FOREIGN PATENT DOCUMENTS

| | | |
|---|---|---|
| CN | 207064807 U | 3/2018 |
| FR | 2221725 A1 | 10/1974 |
| FR | 2883969 A1 | 10/2006 |
| FR | 2883969 B1 | 7/2007 |
| JP | H1194687 A | 4/1999 |
| RU | 123838 U1 | 1/2013 |
| RU | 2625072 C1 | 7/2017 |
| WO | 2018051287 A1 | 3/2018 |
| WO | 2020039067 A1 | 2/2020 |

OTHER PUBLICATIONS

English translation of Russian office action and search report in Russian Application No. 2021104557/12(010062) as of Nov. 21, 2022, 7 pages.

International Search Report and Written Opinion in International Patent Application No. PCT/EP2019/072582 mailed Sep. 12, 2019, 11 pages.

Canadian Examiner Report in Canadian App. No. 3,110,418 dated Oct. 16, 2023, 5 pages.

* cited by examiner

SYSTEM FOR TESTING A VALVE

RELATED APPLICATIONS

This application is a U.S. national stage filing under 35 U.S.C. 371 of PCT/EP2019/072582, filed Aug. 23, 2019, and entitled "SYSTEM FOR TESTING A VALVE," which claims the priority benefit of Norwegian Application No. 20181116, filed Aug. 24, 2018, each of which is incorporated herein by reference in its entirety.

TECHNICAL FIELD

The present invention concerns a portable system for testing a valve in a process plant.

BACKGROUND

Related and Prior Art

A process plant in broad sense, e.g. a chemical factory on land, an offshore production platform for oil or gas, or a water treatment system aboard a ship, comprises numerous valves and valve systems that need periodic testing, maintenance and certification. For simplicity, we will refer to all valves and valve systems to be tested as 'the valve'. Each such valve has an upstream isolation valve (UIV) that can be closed to isolate the valve for testing or maintenance. Some, but not all, valves have a downstream isolation valve (DIV) for the same purposes. For example, a safety valve may be open to the atmosphere in its downstream end, and thus need no DIV.

We consider a sequence UIV—valve—DIV and keep in mind that the DIV is optional, and that the 'valve' in the middle is one of several types of valves, valve systems and pressure reduction devices, each having a specific test and maintenance plan. Further, we associate each valve with a 'test suite' to be performed at predefined test intervals. Each test suite involves applying a series of pressures, flow rates etc. to the valve and measuring various responses to each applied parameter value. The measurements in a test suite may regard leakage, response times, resistance to applied pressure and numerous other parameters. The test suite as defined does not apply to the isolation valves (IVs). However, the IVs also need testing to ensure they do not leak when needed.

Traditionally, valves have been tested and certified in a workshop or laboratory. The downtime caused by dismounting, transporting, testing and remounting the valve may be expensive, especially if testing takes a significant production line out of operation. Thus, there is a general need to perform the testing as quickly as possible. Furthermore, transporting and remounting the valve increase the risk for damage to the valve and pipe connections to some degree. Thus, there is a need for testing in-line, i.e. without moving the valve.

In general, a test suite is started and monitored by a human operator, and may be automated to some degree. For example, a test pressure may be set manually by the operator or automatically by means of a computer. Either way, the computer may record the resulting 2 set of measurements on disk or similar (non-volatile memory) for later retrieval and reports. There is a general need to automate as much as possible.

An automated system generally has a master program that monitors and manages several devices and subsystems. In the following, we call this master program a 'controller'. In a portable test system, the controller runs on a portable computer (PC). We have chosen the abbreviation 'PC' deliberately, because the portable computer typically has a processor, an operating system, wireless interfaces, a user interface etc. similar to those familiar from personal computers (PCs), tablets and smart phones. In addition, a subsystem may have an embedded processor with its own operating system etc. We regard an automated system with a (master) controller running on a PC and keep in mind that there may be subsystems with similar properties.

U.S. Pat. No. 6,505,501 discloses a portable diagnostic system for testing gas pressure reduction equipment, hereinafter a gas valve. The diagnostic system comprises an electropneumatic test unit, which provides test pressures over the gas valve. A controller running on a PC receives pressures and valve displacements from transducers in the test unit and on the gas valve. In essence, the controller measures and stores pressures and valve displacements as functions of applied test pressures. The diagnostic system produces reports with test results in a manner suitable for maintenance planning, knowledge based systems, etc.

Due to the large number of parameters in a test suite, we will generalise by using terms from control theory. Control theory regards open loop systems without sensor feedback and closed loop systems with sensor feedback or feed forward. Closed loop systems perform a corrective action in response to the feedback or feed forward. A control system may run open loop until a measurement becomes available, and the control system may have nested loops. Classical ship navigation systems provide an example. In these systems, a position was estimated from repeated measurements of speed and heading until the position could be fixed, e.g. by triangulating landmarks. The corrective action was, of course, to adjust the heading toward an intended destination.

An automated system has a 'controller' as briefly described above. The controller receives measurements from a suite of sensors. Here, the sensors provide measurements of parameters in the test suite, for example pressures, flows, displacements etc.

An 'actuator' is a device for adjusting a physical quantity such as a pressure. The adjusted quantity may be different from the measured quantities: In the navigation system, the captain (equivalent to the controller) changes direction in response to a measured position.

With these definitions, the system in U.S. Pat. No. 6,505,501 may be regarded as an open loop control system with specific sensors, e.g. displacement transducers, and an actuator for adjusting test pressure. Sensors for measuring pressure, flow rates, displacement etc. and corresponding actuators are commercially available, and need no detailed description herein.

General information security aims to ensure that information is confidential, reliable and available. This includes backup routines, redundancy policies etc.

We limit our further description to digital information security, which should be included in the design of all business critical information systems. In particular, test data should be kept confidential, and nobody should be able to alter them undetected. This is ensured by 'encryption' and 'hashing', respectively. Here, 'hashing' means 'providing data with a cryptographic checksum'. (The word has other meanings in other areas of computer science.) Hashing a combination of measurements and identifiers such as a time stamp and a valve ID ensures that nobody can alter the measurements or identifiers undetected. This is called 'proof of origin'.

In accordance with best practice, we assume that eavesdroppers and malicious third parties have the resources of a large state agency. Currently (August 2018), this means that the recommended key length for production systems is 4096 bit (b). However, encryption and hashing algorithms (e.g. SHA256) built into current operating systems and Internet's transport layer security (TLS; used for https etc.) support far shorter keys, typically 128, 256 or 512 b.

The main objective of the present invention is to provide an improved system that solves or alleviates at least one of the problems above while retaining benefits from prior art.

SUMMARY OF THE INVENTION

This is achieved by a portable system for testing a valve in a process plant. The system comprises: an upstream supply line with an upstream connector for connecting to an upstream end of the valve, an actuator for applying a pressure to the supply line, an upstream sensor on the supply line, and a portable computer capable of running a controller. The controller is adapted to receive measurements from the upstream sensor, store the measurements in non-volatile memory, and send control signals to the actuator. The upstream connector permits a fluid contact from the valve to a respective upstream isolation valve.

More particularly, the invention concerns a portable system for testing a valve in a process plant. The system comprises an upstream supply line with an upstream connector for connecting to an upstream end of the valve. It further comprises an actuator for applying a pressure difference to the supply line, an upstream sensor on the supply line and a portable computer capable of running a controller. The controller is adapted to receive measurements from the upstream sensor, store the measurements in non-volatile memory and send control signals to the actuator. The system is distinguished in that the upstream connector permits a fluid contact from the valve to a respective upstream isolation valve.

Accordingly, with the portable system according to the present invention it is possible to test a valve in-line while the valve remains connected via a fluid contact to (i.e. the valve remains in fluid connection with) an upstream isolation valve. The system therefore does not require that the valve be disconnected in order for a test procedure to be applied but instead remains connected within a valve system. This results in significant advantages in terms of a reduced HSE exposure. For example, the claimed system reduces the amount of material and equipment handling required as valve and pipe sections do not need to be removed from their installed position and as such the amount of physical labour required to maintain the valves is significantly reduced. Furthermore the fact that the upstream connector permits a fluid contact from the valve to a respective upstream isolation valve means that the system can also detect a leakage through the isolation valve, allowing for testing of the neighbouring isolation valves during testing of the main valve. The calculated leakage may then also be taken into account when taking measurements relating to the valve to be tested, such as valve leakage and relief pressure.

Testing of many valve parameters can be carried out with solely an upstream connection to the valve. However, in some cases an additional downstream connection can also be used to test further parameters. Therefore in some embodiments the system further includes a downstream return line with a downstream connector for connecting to a downstream end of the valve; a downstream sensor on the return line; wherein the actuator is configured to apply a pressure difference between the supply line and the return line and the controller is adapted to receive measurements from the upstream sensor and the downstream sensor. In this way, further valve parameters can be tested using measurements from sensors at the both the upstream and downstream ends of the valve. Optionally, the downstream connector permits a fluid contact from the valve to a downstream isolation valve. Some valves may only have an isolation valve positioned on the upstream side, for example safety valves may be open to atmosphere on their downstream end. Other valves have an upstream and a downstream isolation valve and, by providing an additional downstream connector which permits fluid communication between the valve and a downstream isolation valve, leakage through the downstream isolation valve may be measured during testing of the valve.

The phrase "permits a fluid contact from the valve to a respective upstream isolation valve and a downstream isolation valve" means that the connector is configured to connect to the valve so as to maintain fluid connection between the valve and a neighbouring isolation valve. In particular, one or both of the upstream connector and downstream connector is configured to connect to the valve such that the connector is in fluid communication with both the valve to be tested and a respective upstream isolation valve and a downstream isolation valve. That is, the upstream connector is connected to the upstream end of the valve so as to place the upstream supply line in fluid communication with both the valve to be tested and an upstream isolation valve and/or the downstream connector is connected to the downstream end of the valve so as to place the downstream return line in fluid communication with both the valve to be tested and a downstream isolation valve. This can be achieved by connecting to the drain ports of the valve to be tested.

In other words, where a valve to be tested is provided in a particular fluid line (or "pipe segment"), with an isolation valve positioned in fluid communication with the valve to be tested via the fluid line, the upstream and/or downstream connector is configured to connect to the valve to be tested whilst maintaining fluid communication between the valve to be tested and an adjacent isolation valve. In this way, there is no requirement to disconnect the valve to be tested and furthermore, leakage of an upstream and/or downstream isolation valve can be checked at the same time as testing the valve to be tested.

Preferably one or both of the upstream connector and downstream connector is configured to connect to a drain port so as to provide the fluid contact (i.e. the fluid connection) between the valve and a respective upstream isolation valve and a downstream isolation valve when connected. Since one or both connectors are configured to connect to the drain port such that the pressure difference is applied via the drain port, the valve remains connected via main fluid line (pipe segment) to the isolation valve. In this way the valve to be tested remains in fluid communication with the isolation valve through the pipe section, i.e. the main pipe section connecting the valve to be tested and the isolation valve and the valve does not need to be disconnected from the fluid line in which it is positioned (the main valve inlet and outlet remain connected to the neighbouring isolation valves), enhancing the ease with which the valve can be tested, while allowing leakage of the isolation valves to be tested. Generally the drain ports are positioned near the valve to be tested in the fluid line but they may also be distanced from the valve, as long as a pressure may be applied via the drain port to the valve to be tested. The drain port is generally positioned between the valve to be tested and a neighbouring isolation valve.

Preferably the upstream sensor and/or downstream sensor are pressure sensors and/or flow sensors and the controller is configured to receive one or more measurements from the sensors and determine a leakage through an upstream isolation valve and/or a downstream isolation valve. Preferably the controller is configured to receive one or more measurements from the sensors and determine a parameter of the valve to be tested, where the parameter may include a leakage and/or an activation pressure (set pressure test).

The controller is preferably configured to calculate determine a leakage through an isolation valve by receiving a measurement from the upstream sensor and receiving a measurement from the downstream sensor while the valve is open and calculate a difference between the measurement from the upstream sensor and the measurement from the downstream sensor. In this way, without disconnecting the valve, leakage through an upstream and/or downstream isolation valve can be determined in a straightforward manner.

Preferably the controller is configured to control the actuator to apply a pressure to an upstream connector or a downstream connector while the valve is closed; and receive a measurement from the respective upstream sensor or downstream sensor to determine a leakage through a respective upstream isolation valve or a downstream isolation valve. In this way, the system need only be connected to one side of the valve, for example by connecting to a drain port, and the leakage through the corresponding isolation valve can be determined using a pressure or flow sensor. The set pressure of the valve may be tested at the same time.

Preferably the actuator is configured to provide pressurised nitrogen such that the pressure difference between the supply line and the return line is provided by providing pressurised nitrogen through one or both of the upstream connector and downstream connector to the corresponding drain port. In particular the portable system may be configured to connect to a supply of pressurised nitrogen and supply this via one or both connectors to the corresponding drain port. The system may equally apply other pressurised gasses such as air or oxygen.

Preferably the upstream supply line and downstream return line comprise flexible hoses. The hoses may have a length of between 1 and 50 m. In this way, the portable system may be connected to a valve to be tested quickly in a straightforward manner by connecting the system to the drain ports of a valve to be tested using the flexible hoses.

In some embodiments, the controller has a decision function that sends separate control signals depending on a received measurement. These embodiments implement a closed loop, and permit branching into separate sub routines depending on a test result.

In preferred embodiments, the portable computer further comprises a security system capable of combining measurement data and identifying information in a data file, compute a hash of the data file and storing the hash in a hash file.

Hashing provides integrity of test data, specifically that any change to the data is easy to detect. Hashing the combination of measurement data and identifying information provides proof of origin.

The security system preferably has further functions for encrypting a computer file. This ensures confidentiality.

In a further aspect of the invention there is provided a method of testing a valve in a process plant, the method comprising: connecting an upstream supply line to the upstream end of the valve with an upstream connector; applying a pressure to the upstream supply line; and measuring a parameter of the valve with a sensor; characterised in that the upstream connector is connected so as to permit a fluid contact (i.e. a fluid connection) between the valve and a respective upstream isolation valve and a downstream isolation valve when connected. In this way, it is not required to disconnect the valve from the fluid line within the process plant in order to test the valve improving the speed and efficiency with which valves can be tested. Furthermore the fluid contact permitted by the connectors allows for the isolation valves to be tested for leakage during testing of the valve to be tested.

Preferably at least one of the upstream connector and downstream connector is connected to a drain port of the valve so as to permit the fluid connection between the valve and a respective upstream isolation valve and a downstream isolation valve when connected. By connecting to the drain ports rather than the main valve inlet/outlet, the valve can be tested without disconnecting the main valve inlet/outlet. Furthermore, the isolation valves can be tested at the same time as testing the primary valve to be tested.

Preferably the pressure difference is applied by applying pressurised nitrogen through an upstream and/or downstream drain port.

Preferably the method further comprises; closing the upstream and/or downstream isolation valve to isolate the valve to be tested before applying a pressure difference. This isolates the valve from the remainder of the system while it is tested, without requiring the valve to be disconnected. Furthermore it allows leakage through the isolation valves to be tested while they are closed.

In some embodiments the method further comprises measuring the pressure or flow rate in the upstream supply line and/or downstream supply line; determining a leakage through an upstream isolation valve or a downstream isolation valve.

More specifically the method may comprise measuring the pressure or flow rate in the upstream supply line and in the downstream supply line while the valve is open; and determining leakage through the upstream isolation valve or downstream isolation valve by calculating a difference between the pressure or flow rate in the upstream supply line and the downstream supply line.

In another example the method may comprise applying a pressure to an upstream supply line or the downstream return line while the valve is closed; measuring the pressure or flow rate in the respective upstream supply line or the downstream supply line; determining a leakage through the respective upstream isolation valve or downstream isolation valve based on the measured pressure or flow rate. In this way, only one connection to one side of the valve is required to measure the leakage in the respective isolation valve.

In some embodiments, wherein the valve is preferably a pressure safety valve, the method further comprises: applying an increasing pressure through a drain port of the pressure safety valve until the valve opens; measuring the applied pressure at the point that the valve opens. In this way, the relief pressure can be measured precisely without disconnecting the pressure safety valve from the surrounding system.

In some embodiments the method further comprises: applying a constant pressure to an upstream drain port of the valve; and measuring a flow rate through a downstream drain port through the return line connected to the downstream drain port. In this way, leakage through the valve can be measured precisely without disconnecting the pressure safety valve from the surrounding system.

In a further aspect of the invention there is provided a portable system for testing a valve in a process plant, the system comprising: a supply outlet for connecting to an upstream end of the valve; an actuator applying a to the supply outlet; a sensor in connection with the supply outlet; a portable computer capable of running a controller, wherein the controller is adapted to receive measurements from the sensor, store the measurements in non-volatile memory and send control signals to the actuator; wherein the controller is further configured to: determine a parameter of the valve using the measurements received from the sensor; and calculate determine a leakage through an isolation valve in fluid connection with the valve using the measurements received from the sensor.

The supply outlet may be connectable with any appropriate fluid line to the upstream side of the valve, whilst maintain fluid communication to an upstream isolation valve, for example by connecting with a length of hose to an isolation valve, to apply a pressure and take a measurement with the sensor. The portable system may therefore be connected to the drain ports of a valve to be tested using conventional fluid connections, such as flexible hoses, and, since the controller is adapted to calculate leakage through a connected isolation valve, the leakage through the isolation valves may be measured while the valve remains connected. The portable system may therefore be supplied independently of the upstream and downstream supply lines and these may be connected in use to test a valve in-line while simultaneously testing the leakage through the connected isolation valves.

In some examples the system further comprises a return inlet for connecting to a downstream end of the valve; a sensor in connection with the return inlet; wherein the actuator is configured to apply a pressure difference between the supply outlet and the return inlet and the controller is configured to receive measurements from both sensors.

Preferably, the sensors are either pressure sensors or flow sensors and the controller is configured to control the actuator while the valve is closed; and receive a measurement from the respective upstream sensor or downstream sensor to calculate determine a leakage through the respective upstream isolation valve or a downstream isolation valve.

Preferably, the sensors are either pressure sensors or flow sensors and the controller is configured to calculate the leakage through an isolation valve by receiving a measurement from the upstream sensor and receiving a measurement from the downstream sensor while the valve is open and calculate a difference between the measurement from the upstream sensor and the measurement from the downstream sensor.

In some examples the system further comprises a supply line with an upstream connector for connecting the supply outlet to an upstream end of the valve; and, optionally, a downstream return line with a downstream connector for connecting the return inlet to a downstream end of the valve; wherein at least one of the upstream connector and downstream connector permits a fluid contact from the valve to a respective upstream isolation valve and a downstream isolation valve. Preferably one or both of the upstream connector and downstream connector is configured to connect to a drain port of the valve so as to provide the fluid connection between the valve and a respective upstream isolation valve and a downstream isolation valve when connected.

BRIEF DESCRIPTION OF THE DRAWINGS

Embodiments of the invention will now be described, by way of example only, with reference to the accompanying drawings, in which.

The invention will be better explained in the following detailed description with reference to the accompanying drawings, in which.

DETAILED DESCRIPTION

The drawings are schematic and not to scale. For ease of understanding, we have omitted numerous details known to those skilled in the art from the drawings.

Figure 1:
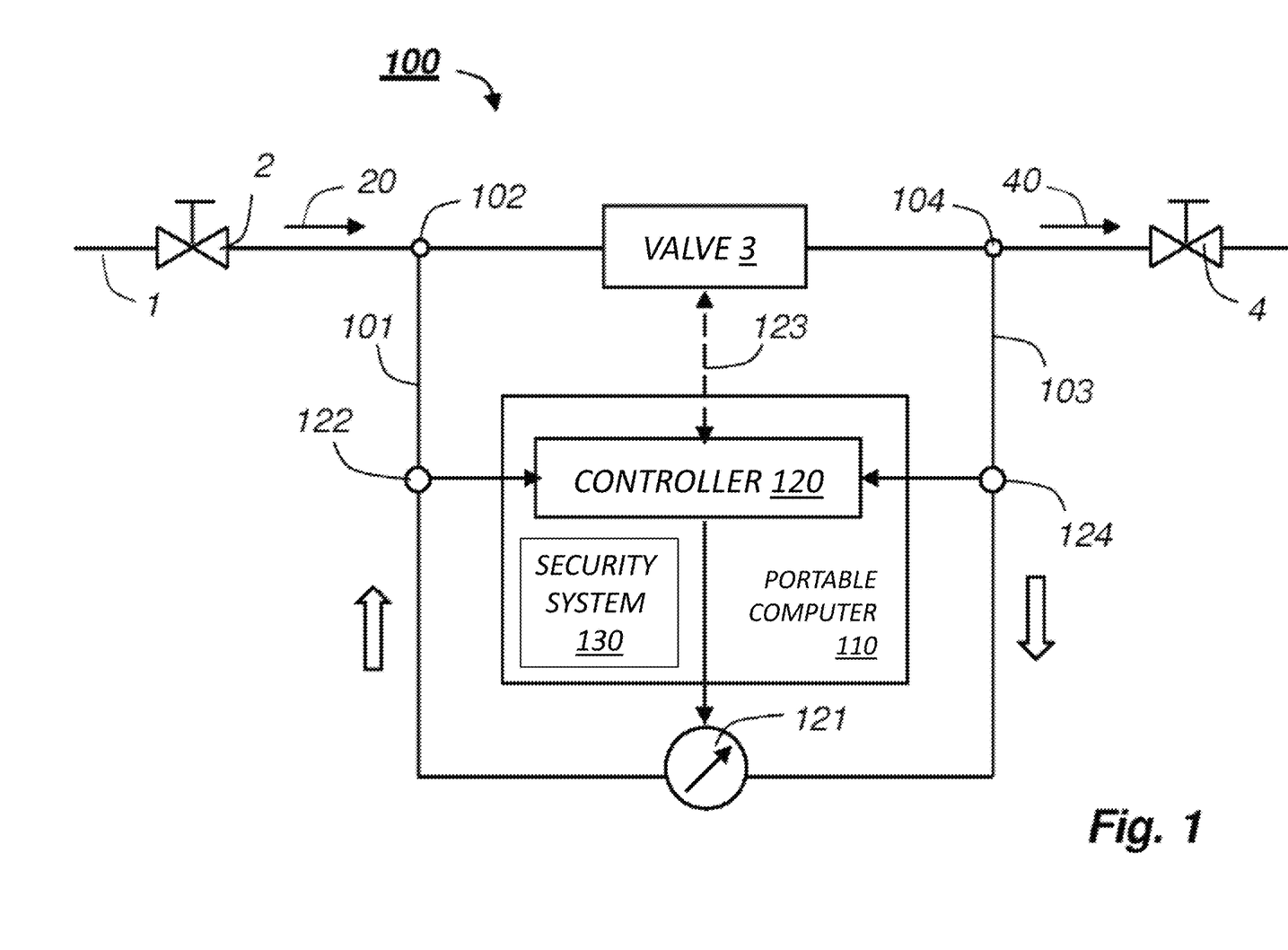
FIG. 1 illustrates a system according to the invention.

FIG. 1 illustrates a portable system 100 according to the invention inserted in a pipe 1 during testing. Specifically, the pipe 1 comprises an upstream isolation valve (UIV) 2, a valve 3 as defined in the introduction, and a downstream isolation valve (DIV) 4. The system 100 performs a test suite on the valve 3, and the isolation valves (IVs) 2 and 4 are closed during the duration of the test suite.

In order to perform the test suite on the valve 3, the system 100 comprises an upstream tube 101 with an upstream connector 102 coupled to an upstream connector on the valve 3. It is possible to carry out a number of tests only using this upstream connection 101 to the valve 3. In particular, many important valve parameters such as activation pressure and leakage may be tested by applying a pressure to the supply line 101 and measuring parameters such as flow rate or pressure in the supply line 101 using an upstream sensor 122, as will be described further below. However, in the example of FIG. 1, the system 100 also includes the optional downstream tube 103 with a downstream connector 104 which is coupled to a downstream connector on the valve 3.

A key feature of the system 100 is that at least one of the upstream and downstream connectors 102, 104 is in fluid connection with its respective IV 2, 4. This enables us to detect an upstream leakage 20 through the UIV 2 and/or a downstream leakage 40 through the DIV 4. In particular, a controller 120 is configured to receive measurements from a sensor 122 connected to the upstream side of the valve (and optionally an additional sensor 124 connected to the downstream side of the valve) and the controller is configured to determine a leakage through the isolation valve 2 based on the signals received from the one or more sensors 122, 124, as well as determine various parameters of the valve 3 to be tested. Thus, the integrity of the UIV 2 and/or the DIV 4 may be tested onsite when the valve 3 is being tested. This saves significant time, effort and cost compared to separate (off-site) testing. As described above, certain valve types, such as pressure safety valves, may only have an isolation valve on an upstream side and may, for example, open to atmosphere on their downstream side. It is therefore clear that, the system only requires one, upstream, connection in these cases which permits a fluid connection with the upstream isolation valve 2.

The connection may be achieved by connecting one or both of the upstream tube 101 and downstream tube 103 to a corresponding upstream or downstream drain valve. This allows the main valve inlet and outlet to remain connected to the rest of the surrounding system, via the main pipe segment 1 which is in fluid communication with the UIV 2 and DIV 4. Therefore, unlike known systems in which the valve 3 must be disconnected in order for the test pressures to be applied through the main valve inlet and outlet, with the present invention, the valve can remain connected within the line 1 and can be tested in-line. The portable system 100 includes an outlet which is configured to be connected with an upstream tube 101 to the drain port via upstream connector 102. The portable system 100 further includes an inlet which is configured to be connected with a downstream tube 103 to a downstream drain port with downstream connector 104.

The upstream 102 and downstream 104 connectors are configured to be connected in a drain port to form a sealed fluid connection with the drain port, allowing a pressurised fluid to be applied to the valve via the upstream connector 102 and a fluid to be received from the valve via the downstream connector 104. The upstream and downstream tubes 101, 103 may be provided by flexible hoses, the upstream hose being connected between the outlet of the system 100 and the upstream drain port and the downstream tube being connected between the inlet and the downstream drain port. In some valves or in some test routines only the upstream connector 102 is connected to a drain port and various valve parameters may be measured upstream. The portable unit 100 may be supplied without the upstream and downstream tubes 101, 103 as these may be provided simply by standard flexible hoses, and as such the unit may be connected in-line in a straightforward manner to the drain ports using standard equipment.

By connecting to the drain ports in this way, leakage through the isolation valves 2, 4 may be tested. For example, to test the leakage through isolation valve 2, firstly upstream isolation valve 2 is closed to isolate the valve 3. Then, any leakage 20 through the isolation valve 2 will flow through to the valve and into upstream line 101 via the connection 102 to the drain port. This leakage may therefore be measured by a flow rate sensor (or pressure sensor) within the portable system 100 connected to the upstream line 101. Alternatively, as described in more detail below, a pressurised fluid, normally nitrogen, may be applied using actuator 121 through the connector 102 attached to the upstream drain port. Since the drain port is in fluid connection with the valve 3 to be tested and the upstream isolation valve 2, the fluid pressure is applied to the isolation valve and may force a leakage back through the isolation valve which can be detected with a pressure or flowrate sensor 122 connected by the upstream line 101 to the drain port. This is described further below with reference to FIG. 3.

The leakages 20, 40 illustrated in FIG. 1 are presumably 'small'. More precisely, they are small enough to be undetectable when the system 100 is connected to the pipe, and involve pressures or flows that are much smaller than those in a test suite. Moreover, all sensors have a limited sensitivity and a certain uncertainty. A first problem is thus to identify and quantify a small leakage 20, 40 in a large, noisy signal produced during the test suite. A related problem is to compensate for a leakage 20, 40 in the measurements obtained in the test suite. This will be further explained with reference to FIGS. 3 and 4.

The portable computer (PC) 110 runs two major subsystems important for the invention: a controller 120 and a security system 130.

The controller 120 applies a test pressure or a test flow by means of an actuator 121. For illustration, broad arrows illustrate a possible fluid flow through a test loop 101-104 that includes the valve 3. Of course, pressure tests do not necessarily involve significant flows. A suite of upstream sensors 122 and, optionally, a suite of downstream sensors 124 measure parameters of interest, for example pressures and/or flowrates, that arise from the pressure applied by the actuator 121. The controller 120 receives the measurements and stores them in non-volatile memory of any known type for later retrieval, reporting etc. The controller 120 is therefore configured to calculate various properties, such as activation pressure and leakage of the main valve 3, while also calculating leakage through an isolation valve 2, 4, as described din more detail below. As stated above, although here, the applied pressure and connections 101, 103, provide the illustrated fluid flow loop 101-104, many parameters of the both the valve 3 and the UIV 2/DIV 4 can be tested using a single connection 101 to one side of the valve 3.

'Certification' as used herein, has the usual meaning 'compliance with a standard', for example an API standard. Specifically, this means that the actuator 121 and sensors 122, 124, and the test suite must comply with the pertinent standard, and that the measurements must be within limits specified in the standard. Selecting appropriate sensors and actuators is left to the skilled person. Validity and origin of the measurement is another important aspect of certification, which will be described below.

The control system 120-124 runs open loop as long as the controller 120 does not issue an action in response to the sensor input. That is, the controller 120 normally applies a series of prescheduled test pressures according to the test suite, and simply records and stores the resulting measurements. However, we also anticipate closed control loops and branched test procedures. In these cases, the controller 120 executes different sub-procedures depending on input from the sensors 122, 124. For example, a measurement below some threshold may cause the controller 120 to run a set of extra diagnostics, whereas a measurement above the threshold is simply stored.

Additional sensor(s) and actuator(s) may be mounted on the valve 3. A doubleheaded dashed arrow 123 illustrate the associated optional sensor and control signals to and from the controller 120.

The security system 130 essentially hashes and encrypts test data. As mentioned in the introduction, so-called 'proof of origin' may be obtained by creating and hashing a data file with measurement data and identifying information such as a time stamp, a valve ID for the valve 3, an identifier for a human operator performing the test, etc. In general, hashing authenticates and ensures the integrity and validity of measurements. This is vital for automatic certification.

The controller may receive identifying information from various sensors other than pressure sensors and flow meters. For example, a barcode reader may provide a valve ID, and a smart card or a password entered on a keypad may identify a human operator.

One set of measurements relating to one test pressure and one valve has relatively low value, so a relatively short key and associated hash algorithm, e.g. SHA 256, may be preferred for measurement data. A large set of measurement data associated with a test suite has considerably greater value, and may be hashed and encrypted with, for example, 4096 b keys. The protected package may then safely be sent over the Internet, where it may be further encrypted and hashed, e.g. by TLS (transport layer security) on an HTTPS connection.

The controller 120 and security system 130 just described may be implemented on any known platform, for example a Windows or Unix-like operating system over one or more Intel cores(s) as in a typical personal computer and/or one or more ARM processor(s) as in a typical smart phone, tablet or embedded device. All of these platforms may provide a suitable user interface that allows an operator to select and start an appropriate test procedure for the valve 3 to be tested. As known to those skilled in the art of computer science, separate processes or threads may be distributed to separate processes or cores. That is, no inventive effort is required to divide the system 100 into other subsystems than those shown in FIG. 1.

Figure 2:
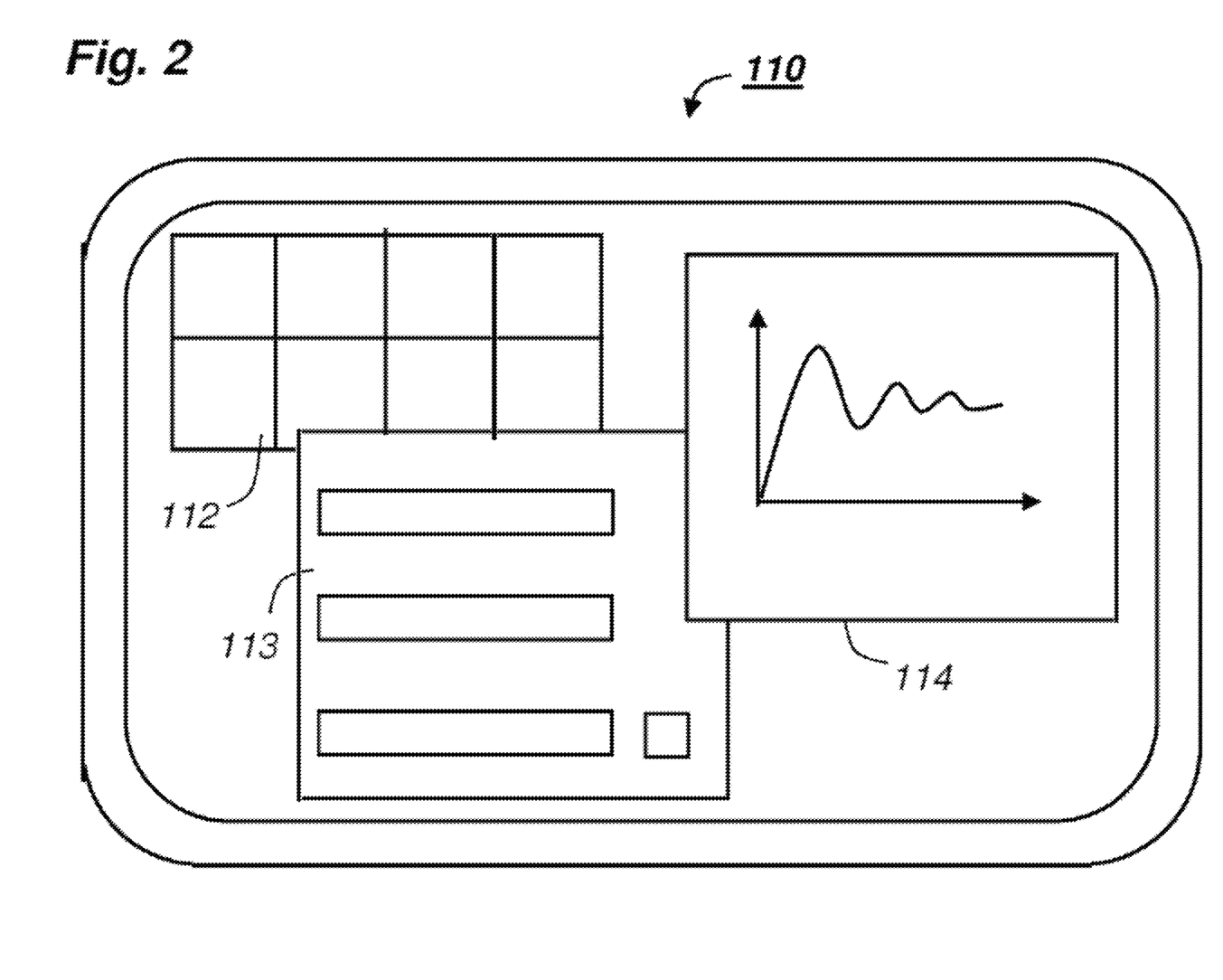
FIG. 2 illustrates a user interface on a portable computer.

FIG. 2 depicts a portable computer (PC) 110 with a graphical user interface (GUI) and a touch screen. Real embodiments may use any other known I/O-devices, including nongraphical displays, keypads, mice, trackballs and other pointing devices.

In FIG. 2, a menu 112 enables a human operator to select a test suite. A parameter window 113 permits the operator to set, verify and adjust parameters as needed. A result window 114 enables the operator to monitor progress. Similar windows are known in the art and need no further explanation herein.

Figure 3:
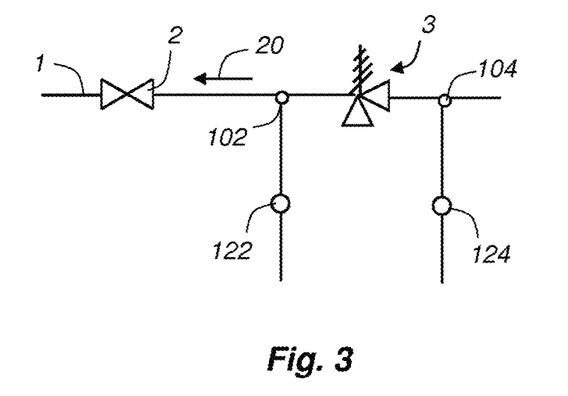
FIG. 3 shows an embodiment with a specific valve.

FIG. 3 shows part of a test assembly with parts and reference numerals equal to those in FIG. 1. In FIG. 3, a pressure safety valve (PSV) is a concrete example of a valve 3 as defined in the introduction. Parameters of the PSV 3 and the neighbouring isolation valve 2 may be tested in a number of ways. In one example of the testing of the PSV, a pressure is applied to the upstream connector 102, causing a small leakage 20 back through the UIV 2. The leakage 20 may be determined from a measured flow rate or pressure change with upstream sensor 122. In other words, the downstream connector 104, is not necessary to test parameters of both the PSV 3 and the UIV 3. In particular, while the PSV 3 is closed, an increasing pressure may be applied to the upstream connector 102 to determine the activation pressure when the PSV 3 opens. Similarly, for example before testing this activation pressure, the leakage through the UIV 2 may be determined by applying a pressure to connector 102 and measuring a flow rate of pressure with sensor 122 to determine the leakage 20 back through the UIV 2.

The leakage 20 through the UIV 2 may be detected by pressure sensors with sufficient sensitivity to detect small deviations in pressure. Alternatively, leakages may be detected by mass flowmeters and a comparison of supplied and detected masses. Coriolis mass flowmeters have useful properties, are available from several vendors, and should be considered in the design phase. In the case of liquids, which are incompressible for practical purposes, volume flowmeters may replace mass flowmeters.

Figure 4:
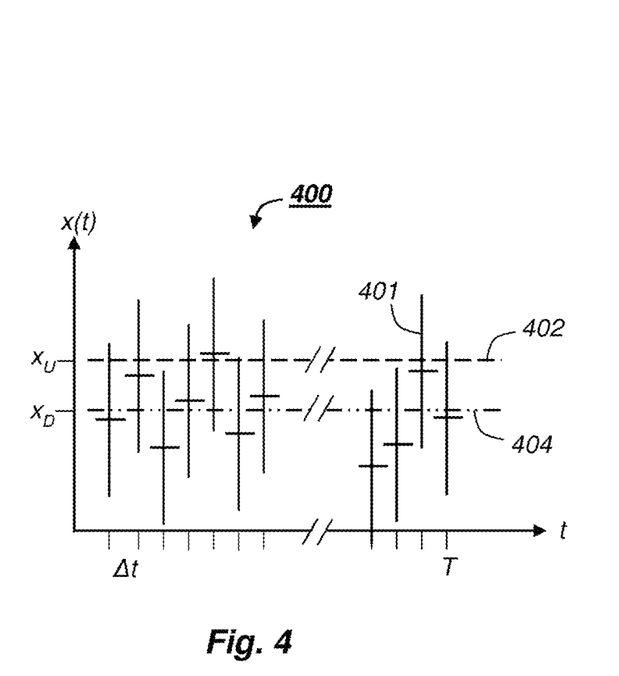
FIG. 4 illustrates statistical methods.

FIG. 4 shows a set 400 of N samples 401 of a noisy signal x(t) acquired during a test period T=NΔt where Δt is a sampling interval. Each sample 401 has a measured value xn=x(nΔt) where n is an integer. Short horizontal bars indicate the values xn, and longer vertical lines indicate uncertainty (variance) associated with each sample. This figure illustrates a method in which measurements from both the upstream and downstream sides of the valve 3 are used to determine a a parameter of the valve 3 and to measure leakage through the UIV 2. In particular, in contrast to the measurements described above, in this example a connection is made to the drain ports with both the upstream 102 and downstream 104 connectors and respective upstream 122 and downstream 124 sensors in communication with the connectors are used to take measurements of pressure or flow rate at both sides of the valve.

For example, T may correspond to a period in which the PSV 3 in FIG. 3 is open. In this example, the samples 401 discretize a signal x measured by downstream (pressure or flow) sensors 124. Some values xn are above the line 404 and some are below the line 404 due to noise. On average, the noise contributes equally much in both directions, and cancels if we add all values xn. Adding all values xn also amplifies the 'true signal' x. Next, we may divide the sum by N to obtain a sample mean xD represented by the horizontal line 404.

A similar horizontal line 402 illustrates a similar sample mean xU obtained from the upstream sensors 122. The difference between the sample means, xD−xU, estimates size and direction of the leakage 20 in FIG. 3. A similar difference between sample means may be used to detect and quantify the leakage 40 through the DIV 4 in FIG. 1.

In terms of signal processing and statistics, 'summation' (adding time shifted samples) cancels incoherent noise and amplifies a coherent constant signal x(t). Sample means xU, xD are useful and easily computed estimates for constant signals x. For a general (not constant) noisy signal x(t), autocorrelation, i.e. correlating the sampled signal with itself, cancels incoherent noise and enhances the coherent signal. 'Semblance' is a related technique.

In the present application, the samples xn represent any measured quantity, e.g. a pressure or a flow, and the sample mean may provide an accurate estimate for a small leakage. In particular, summation amplifies a weak constant signal and facilitates extraction from a very noisy signal. This amplification and the accuracy of the sample mean increase with increasing N, that is, with longer periods T and/or shorter sampling intervals Lt.

Similar to the above, the sum of individual variances may divided by N to obtain a sample variance, etc. The variance is affected by several factors, for example the limited accuracy of a sensor. Sensor technology and signal processing as such are outside the scope of the present invention. However, the present invention may of course include known methods and techniques from other fields, e.g. the fields of signal processing and statistics for noise reduction and estimation.

While the invention has been described by way of specific embodiments and examples, the full scope of the invention is defined in the following claims.

The invention claimed is:

1. A portable system (100) for testing a pressure safety valve (3) in a process plant, where the pressure safety valve (3) is connected to an upstream isolation valve (2), the portable system (100) comprising:
   an upstream supply line (101) with an upstream connector (102) for connecting to a drain port at an upstream end of the pressure safety valve (3);
   an actuator (121) for applying a pressure to the upstream supply line (101);
   an upstream sensor (122) on the upstream supply line (101); and
   a portable computer (110) capable of running a controller (120),
   wherein the controller (120) is adapted to receive measurements from the upstream sensor (122), store the measurements in non-volatile memory, and send control signals to the actuator (123),
   wherein the upstream sensor (122) is a pressure sensor or flow sensor and the controller is configured to receive one or more measurements from the upstream sensor (122) and determine a leakage through the upstream isolation valve (2) and subsequently instruct the actuator to apply an increasing pressure through the drain port when the pressure safety valve (3) is closed until the pressure safety valve (3) opens, measure the increasing pressure at a point at which the pressure safety valve (3) opens with the upstream sensor (122), and determine an activation pressure of the pressure safety valve (3) taking into account the leakage through the upstream isolation valve (2).

2. The portable system (100) according to claim 1 further comprising:
a downstream return line (103) with a downstream connector (104) for connecting to a downstream end of the pressure safety valve (3); and
a downstream sensor (124) on the downstream return line (103); wherein the actuator is configured to apply a pressure difference between the upstream supply line (101) and the downstream return line (103) and the controller (120) is adapted to receive measurements from the upstream sensor (122) and the downstream sensor (124),
wherein the downstream connector (104) is configured to connect to the drain port such that the pressure safety valve (3) remains directly connected to a downstream isolation valve (4) during testing.

3. The portable system (100) according to claim 2 wherein the downstream sensor (124) is a pressure sensor or flow sensor and the controller is configured to receive one or more measurements from the downstream sensor (124) and determine a leakage through a downstream isolation valve (4).

4. The system (100) according to claim 3 wherein the controller (120) is configured to determine the leakage through the upstream isolation valve (2) and/or the leakage through the downstream isolation valve (4) by receiving a measurement from the upstream sensor (122) and receiving a measurement from the downstream sensor (124) while the pressure safety valve (3) is open and calculate a difference between the measurement from the upstream sensor (122) and the measurement from the downstream sensor (124).

5. The portable system (100) according to claim 3 wherein the controller (120) is configured to control the actuator (121) to apply a pressure to the upstream connector (102) or a downstream connector (104) while the pressure safety valve is closed; and receive a measurement from the upstream sensor (122) or the downstream sensor (124) to determine the leakage through the upstream isolation valve (2) or the leakage through the downstream isolation valve (4).

6. The portable system (100) according to claim 2 wherein the actuator (121) is configured to provide pressurised nitrogen such that the pressure difference between the upstream supply line (101) and the downstream return line (103) is provided by providing pressurised nitrogen through one or both of the upstream connector (102) and the downstream connector (104) to the corresponding drain port.

7. The portable system (100) according to claim 2 wherein the upstream supply line (101) and the downstream return line (103) comprise flexible hoses.

8. The portable system (100) according to claim 1, wherein the controller (120) has a decision function that sends separate control signals depending on the measurements received from the upstream sensor (122).

9. The portable system (100) according to claim 1, wherein the portable computer (110) further comprises a security system (130) capable of combining the measurement and identifying information in a data file, computing a hash of the data file, and storing the hash in a hash file.

10. The portable system (100) according to claim 9, wherein the security system (130) has further functions for encrypting a computer file.

11. A method of testing a pressure safety valve (3) in a process plant, where the pressure safety valve (3) is connected to an upstream isolation valve (2) the method comprising:
connecting an upstream supply line (101) to the upstream to a drain port end of the pressure safety valve (3) with an upstream connector (102);
applying a pressure to the upstream supply line (101);
determining a leakage through the upstream isolation valve (2);
instructing an actuator to apply an increasing pressure through the drain port when the pressure safety valve (3) is closed until the pressure safety valve (3) opens;
measuring the increasing pressure at a point at which the pressure safety valve (3) opens with an upstream sensor (122); and
determining an activation pressure of the pressure safety valve (3) taking into account the leakage through the upstream isolation valve (2),
characterised in that the upstream connector (102) is connected to the drain port such that the pressure safety valve (3) remains fluidically connected to the upstream isolation valve (2) during testing.

12. The method of claim 11 further comprising:
connecting a downstream return line (103) to the downstream end of the pressure safety valve (3) with a downstream connector (104), and
applying a pressure difference between the upstream supply line (101) and the downstream return line (103).

13. The method of claim 12 wherein the downstream connector (104) is connected to the drain port such that the pressure safety valve (3) remains directly connected to a downstream isolation valve (4) during testing.

14. The method of claim 11 wherein the pressure is applied by applying pressurised nitrogen through an upstream and/or downstream drain port.

15. The method of claim 13 further comprising:
closing the upstream isolation valve and/or the downstream isolation valve to isolate the pressure safety valve to be tested before applying a pressure.

16. The method of claim 15 further comprising:
measuring the pressure or flow rate in the upstream supply line (101) and/or downstream return line (103); and
determining a leakage through a upstream isolation valve (2) or a downstream isolation valve (4).

17. The method of claim 16 further comprising:
measuring the pressure or flow rate in the upstream supply line (101) and in the downstream supply line (103) while the pressure safety valve is open; and
determining the leakage through the upstream isolation valve (2) or the downstream isolation valve (4) by calculating a difference between the pressure or flow rate in the upstream supply line (101) and the downstream supply line (103).

18. The method of claim 16 comprising:
applying the pressure to the upstream supply line (101) or the downstream return line (103) while the pressure safety valve is closed;
measuring the pressure or flow rate in the upstream supply line (101) or the downstream return line (103); and determining the leakage through the upstream isolation valve (2) or the downstream isolation valve (4) based on the pressure or flow rate.

19. The method of claim 13, wherein the pressure safety valve is a pressure safety valve, the method further comprising:
applying an increasing pressure through the drain port when the pressure safety valve is closed until the pressure safety valve opens; and
measuring the applied pressure at a point that the pressure safety valve opens.

20. The method of claim 13 further comprising:
applying a constant pressure to an upstream drain port of the pressure safety valve while the pressure safety valve is closed; and
measuring a pressure or flow rate through the downstream return line.

* * * * *